United States Patent
Daane et al.

(10) Patent No.: US 6,754,196 B1
(45) Date of Patent: Jun. 22, 2004

(54) METHOD AND APPARATUS FOR INCREASING THE EFFECTIVE BANDWIDTH WITHIN A DIGITAL WIRELESS NETWORK

(75) Inventors: John Daane, Saratoga, CA (US); Michael D. Rostoker, Boulder Creek, CA (US); Sandeep Jaggi, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/063,476

(22) Filed: Apr. 20, 1998

Related U.S. Application Data (62) Division of application No. 08/581,743, filed on Dec. 29, 1995, now Pat. No. 5,818,830.

(51) Int. Cl.[7] .............................................. H04Q 7/24
(52) U.S. Cl. ..................... 370/338; 370/445; 370/477; 370/480
(58) Field of Search .............................. 370/328, 338, 370/344, 349, 445, 447, 521, 477, 480, 483, 482; 455/72, 112, 111, 73, 561; 361/718, 719, 720; 710/68; 348/14.13, 240, 240.23

(56) References Cited

U.S. PATENT DOCUMENTS

| | | | |
|---|---|---|---|
| 4,063,220 A | * | 12/1977 | Metcalfe et al. ......... 340/825.5 |
| 4,823,340 A | | 4/1989 | Grassman et al. |
| 4,831,373 A | | 5/1989 | Hess |
| 4,987,571 A | | 1/1991 | Haymond |
| 5,034,993 A | | 7/1991 | Sasuta et al. |
| 5,048,057 A | | 9/1991 | Sale et al. |
| 5,077,828 A | | 12/1991 | Waldroup |
| 5,216,427 A | | 6/1993 | Yan et al. |
| 5,231,634 A | | 7/1993 | Giles et al. |
| 5,239,545 A | | 8/1993 | Bucholz |
| 5,274,841 A | | 12/1993 | Natarajan et al. |
| 5,276,703 A | | 1/1994 | Budin et al. |
| 5,313,461 A | | 5/1994 | Ahl et al. |
| 5,446,735 A | | 8/1995 | Tobagi et al. |
| 5,463,623 A | | 10/1995 | Grimes et al. |
| 5,506,872 A | * | 4/1996 | Mohler ....................... 375/240 |
| 5,668,880 A | * | 9/1997 | Alajajian ..................... 380/49 |
| 5,726,984 A | * | 3/1998 | Kubler et al. ............... 370/349 |
| 5,812,951 A | * | 9/1998 | Ganesan et al. ............ 455/445 |
| 5,862,142 A | * | 1/1999 | Takiyasu et al. ............ 370/480 |
| 6,301,482 B1 | * | 10/2001 | Shohara ................... 455/452.1 |

FOREIGN PATENT DOCUMENTS

EP          0 622 925 A1    11/1994

* cited by examiner

*Primary Examiner*—Ajit Patel
(74) *Attorney, Agent, or Firm*—Christopher P. Maiorana, P.C.

(57) ABSTRACT

A plurality of devices communicate information over a wireless network at radio frequencies. The information includes digital audio, video and data. Bandwidth among the devices is dynamically allocated, the allocation being based upon the needs of the devices. One embodiment of the wireless network is a Time Division Multiple Access network. Another embodiment is a wireless Ethernet. Yet another embodiment is a Frequency Division Multiplexed network.

32 Claims, 4 Drawing Sheets

METHOD AND APPARATUS FOR INCREASING THE EFFECTIVE BANDWIDTH WITHIN A DIGITAL WIRELESS NETWORK

This is a division of application Ser. No. 08/581,743, filed Dec. 29, 1995, now U.S. Pat. No. 5,818,830 issued Oct. 6, 1998.

BACKGROUND OF THE INVENTION

The invention relates in general to wireless communication systems and in particular to wireless local and wide area networks.

There was a time when mainframe computers ruled the workplace. The mainframe was a single high-powered computer located at a central site. Users worked on dummy terminals (i.e., displays and keyboards), which were connected to the mainframe. All programs and all data were stored in the mainframe, and all computations were performed by the mainframe. On mainframes such as the DEC VAX, processor time was allocated to the users based on priority. Low priority users had to share the processor time, while high priority users worked in real-time, monopolizing the processor time until their jobs were completed. Delays resulted from heavy usage among low priority users and from high priority users whose jobs were lengthy. Additionally, mainframes were expensive to purchase and expensive to maintain, requiring a cooled environment and at least one full-time operator.

Then came personal computers, workstations and networks, which ended the reign of the mainframes. Personal computers and workstations contained their own processors, allowing the users to work in real time. Networks allowed the personal computers to share information among each other. They also allowed expensive hardware (e.g., printers) and software to be located at one personal computer (a server) and shared among the other personal computers (clients). The networks were also affordable. It made economic sense for large companies to replace the expensive mainframes with networks of personal computers and workstations. Not only were the networks affordable for large companies, they were affordable for small companies and offices that previously could not afford or justify mainframes. Today, mainframe computers are still in use, but primarily as storage devices. Personal computers, workstations and networks now rule the workplace.

The networks can be classified as local area networks (LANs) and wide area networks (WANs). WANs and LANs differ in several aspects. WANs operate over public networks (i.e., leased lines furnished by third paries such as telephone companies), whereas LANs operate over private networks (i.e., privately owned cables and components). WANs transmit data at rates on the order of thousands of bits per second, whereas LANs transmit data at rates on the order of millions of bits per second. WANs are more error prone because they cover large outdoor geographical areas. Bit Error Rates are on the order of 1 in $10^5$ bits transmitted. LANs, which are typically housed within buildings, have Bit Error Rates on the order of 1 in $10^9$ bits transmitted.

The concept of networking is evolving from wired networks to wireless networks. In a wired network, a signal flows from one device to another across a physical medium such as copper wire or and fiber optic. In a wireless network, a signal flows over the airwaves at a radio frequency. Devices in a wireless network are untethered; unlike the devices in a wired network, they can be moved freely and can tap into a source of information anytime, anywhere. The wireless network also eliminates two unbecoming aspects of wired networks: the unsightliness of cables, and the expense of cable installation.

However, the success of the wireless network will ultimately rest upon its ability to handle large amounts of information in real time. Nowadays, networked computers are being used for the communication of divergent types of information including computer coded graphics and text, audio and video. The information could come in large volumes of data from commercial databases and electronic mail. The information could come in the form of real time video and audio, as required for video conferencing. The information could come from computers that share computer power in multiprocessor multitasking environments, where highly parallel computing is performed with all available computers on a network system. In the future, computers will be faster, and real time information will be needed in even larger volumes.

Wireless networks operating at RF frequencies are presently unable to handle the large amount of information, even by the current standards. When the quantity of information on the network becomes excessively high, the quality of the channel deteriorates. Also, the heavy "traffic" increases the transmission errors, thus inversely reducing the "throughput," the amount of information that can be actually communicated on a channel. Because high error rates are unacceptable, the transmission rates must be lowered in order to decrease the errors. Effectively, the bandwidth of the network is reduced.

It is an object of the present invention to increase the effective bandwidth of a wireless network.

SUMMARY OF THE INVENTION

According to a broad aspect of the present invention, a wireless network comprises a plurality of devices, each of which has at least one transceiver operable over an RF bandwidth. The network further comprises at least one interface that allows the plurality of devices to communicate with each other. The RF bandwidth is dynamically allocated among the devices by the at least one interface. Units of the bandwidth are apportioned among the devices according to the requirements of the devices.

One embodiment of the wireless network according to the present invention is a Time Division Multiple Access network. Another embodiment is a wireless Ethernet. Yet another embodiment is a Frequency Division Multiplexed network.

DETAILED DESCRIPTION OF THE PREFERRED EMBODIMENTS

Figure 1:
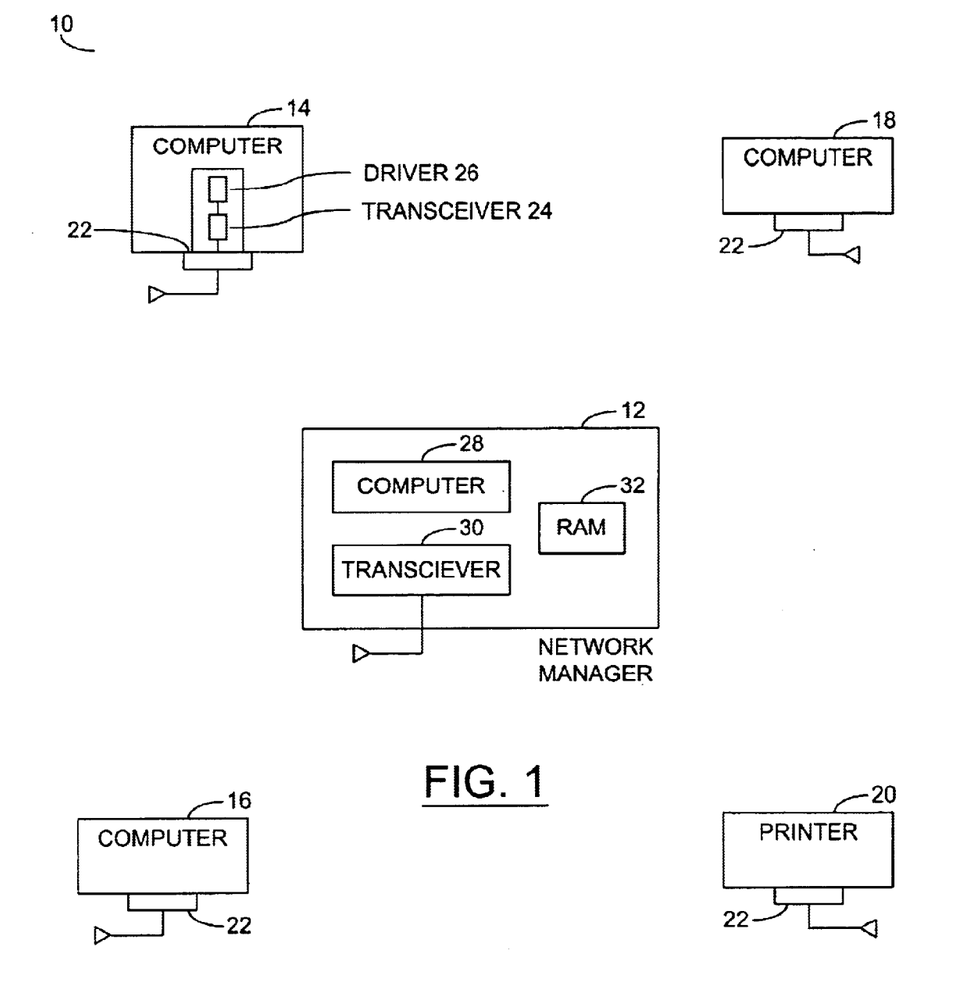
FIG. 1 is a block diagram of a TDMA wireless network according to the present invention.

FIG. 1 depicts a wireless network 10 including a network manager 12 and four devices: a first computer 14, a second computer 16, a third computer 18 and a printer 20. Although four devices 14, 16, 18 and 20 are depicted, any number of devices can be "connected" to the network 10. Also, any type of device can be to the network. Types of devices include, but are not limited to personal computers, workstations, file servers, scanners, and plotters.

The devices 14, 16, 18 and 20 communicate with the network manager 12 over the airwaves at radio frequencies. On a downlink frequency, the network manager sends transmission frames to the devices 14, 16, 18 and 20. On an uplink frequency, the devices 14, 16, 18 and 20 send transmission bursts to the network manager 12. A bidirectional setup frequency allows the network manager 12 and devices 14, 16, 18 and 20 to establish communication links.

Mounted to the backplate of each device 14, 16, 18 and 20 is an interface card 22. Each interface card 22 includes a transceiver 24, which transmits the bursts over the uplink and setup frequencies and which receives frames over the downlink and setup frequencies. Each interface card 22 also includes a device driver 26, a processor that is programmed to control the transceiver 24 and provide an interface between the transceiver 24 and the device's operating system.

The network manager 12 is essentially a dedicated computer 28 equipped with a transceiver 30 for transmitting frames over the downlink and setup frequencies and for receiving bursts over the uplink and setup frequencies. The computer 28 includes Random Access Memory (RAM) 32 having a section that is apportioned into a plurality of queues. A queue is a First-In, First-Out (FIFO) buffer. At least one queue is provided for each device 14, 16, 18 and 20.

The network manager 12 communicates with the devices 14, 16, 18 and 20 using a Time Division Multiple Access (TDMA) technique. The RF bandwidth is broken up into a number of time slots, and the time slots are allocated to the devices 14, 16, 18 and 20 by the network manager 12.

Operation of the network manager 12 is illustrated by the following example. The first computer 14, ready to have a text file printed, transmits the text file to the network manager 12. The network manager 12 buffers the text file and determines whether the printer 20 is ready to print the text file. When the printer 20 is ready, the network manager 20 transmits the text file to the printer 20. While the printer 20 is printing out the text file, the second computer 16 becomes ready to transmit a bitmap file for printing. Once the first computer 14 has finished transmitting, the network manager 12 instructs the second computer 16 to transmit the bitmap file. The second computer 16 transmits the bitmap file, and the network manager 12 buffers the transmitted bitmap file. While the second computer 14 is transmitting to the network manager 12, the third computer 18 transmits a file of full-motion video images, destined for the second computer 16. The network manager 12 now must receive data from the second computer 16 and video from the third computer 18. However, the RF bandwidth cannot accommodate all the simultaneous transmission of audio and video.

Therefore, the network manager 12 allocates the time slots among the devices 14, 16, 18 and 20. Allocation is performed by assigning multiple time slots to the devices needing the greatest bandwidth.

Figure 2:
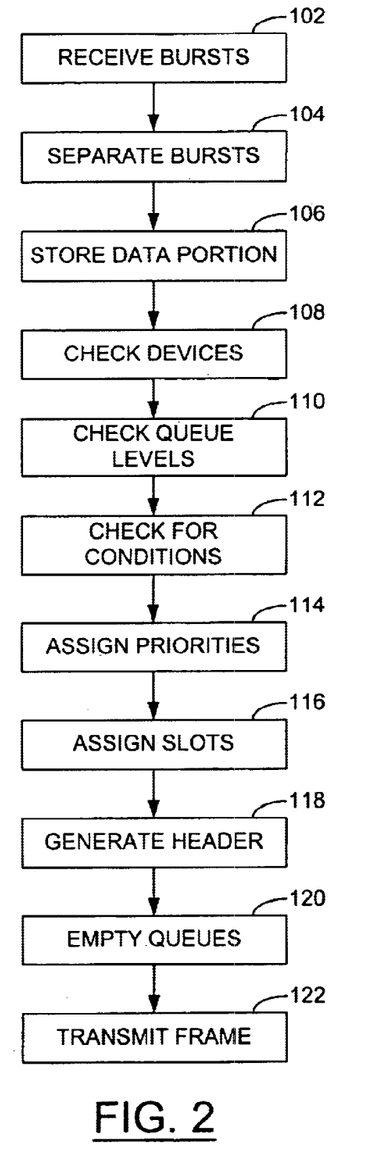
FIG. 2 is a flowchart of steps performed by a network manager for the dynamic allocation of bandwidth among four network devices on a downlink frequency, the network manager and devices being shown in FIG. 1.

FIG. 2 illustrates the steps performed by the network manager 12 for allocating the RF bandwidth among the devices 14, 16, 18 and 20 on the downlink frequency. The network manager 12 receives the bursts from the devices 14, 16, 18 and 20 (step 102). Each burst includes a header portion which specifies a destination device and a data portion. For each burst, the network manager 12 separates the header portion from the data portion (step 104). The data portion is stored in the queue corresponding to the device specified in the header portion (step 106). Thus, for the example above, the network manager 12 includes four queues for the four devices 14, 16, 18 and 20. The text file from the first computer 14 is stored in the printer queue. Stored on top of the text file is the bitmap file from the second computer 16. The video images from the third computer 18 are stored in third computer queue.

When it becomes time to transmit the contents of the queues, the network manager 12 performs steps 108–116, generates a transmission frame in steps 118–120 and transmits the frame in step 122. In step 108, the network manager 12 determines which devices 14, 16, 18 and 20 are ready to receive information. If a device such as the printer 20 is not ready to receive information (because its buffer is full, for example), its queue will be assigned a low priority. This will allow the bandwidth of the downlink frequency to be allocated to the other devices 14, 16 and 18.

In step 110, the network manager 12 examines the levels of the queues. A high priority is assigned to a queue that is approaching overflow. Overflow is a condition that should be avoided. If a queue overflows, contents of the queue will be lost. Allocating extra bandwidth to a device will allow its corresponding queue to be emptied faster.

In step 112, the network manager 12 checks for special conditions. Certain emergency conditions can result in high priorities being assigned. In the example above, the video images are transmitted by the third computer 18 at the same time the second computer 16 is transmitting the bitmap file. If the second computer 16 needs to transmit the bitmap file immediately, a high priority is assigned to the second computer queue and/or a low priority is assigned to the third computer queue. This assignment will allow the second computer 16 to complete its transmission of the bitmap file before the third computer 18 transmits the video images. In this manner, the entire bandwidth of the downlink frequency is allocated to the second computer 16.

In step 114, the network manager 12 assigns priorities to the queues. The prioritizes are based on the determinations made in steps 108–112.

In step 116, slots are assigned to the queues. Each frame includes a control header and a data section. The data section is divided into a plurality of slots. One slot is provided for each device 14, 16, 18 and 20. However, this does not mean that one slot is assigned to the queue of each device. Instead, the slots are assigned by priority. Using the example above, no slots are assigned to the queues for the first and third computers 14 and 18, since no information is being transmitted to those devices 14 and 18. This allows the four slots to be allocated among the second computer 16 and printer 20. Since the second computer 16 is receiving greater amounts of information (video images) than the printer 20 (a bitmap file), it requires greater bandwidth. Therefore, three slots are assigned to the queue of the second computer 16, with the remaining slot being assigned to the queue of the printer 20. Thus, bandwidth is taken from the first and third computers 14 and 18 and given to the second computer 16 and printer 20.

In step 118, the network manager 12 generates a control header indicating the slots assignments. For example, the header can include a device number corresponding to each slot.

In step 120, the network manager 12 empties the contents of the queues into their assigned slots, and in step 122 transmits the frame on the downlink frequency to all of the devices 14, 16, 18 and 20. Even if the data section of the frame is empty, the network manager 12 still transmits a dummy frame.

Steps 116–120 can be implemented using a different approach. The frame still includes a header portion and a data section. However, the data section includes an pre-assigned slot for each device queue and a number of spare slots. In step 116, only the spare slots are assigned to the queues having the highest priorities. In step 118, the control header is generated to indicate only device numbers for the spare slots. In step 120, the contents of the queues are emptied into the pre-assigned slots, and the contents of the highest priority queues are additionally emptied into the spare slots.

Using the example above, the pre-assigned slots for the second computer 16 and printer 20 are filled with the contents of the second computer and printer queues (the pre-assigned slots for the first and third computers 14 and 18 are empty because their queues are empty). Additionally, the spare slots are filled from the queues of the second computer 16 and printer 20. If the bandwidths of the second computer 16 and printer 20 are allocated equally, an equal number of spare slots are assigned to the queues of those devices 16 and 20. If a larger bandwidth is required by the second computer 16, more than half of the spare slots are assigned to it.

Since the network manager 12 and device drivers 26 for the devices 14, 16, 18 and 20 are programmable, the network 10 can use either approach described in steps 116–120. The network 10 could even use both approaches. The approaches could be changed on the fly by the network manager 12, which indicates the change to the devices 14, 16, 18 and 20 on the setup channel.

Figure 3:
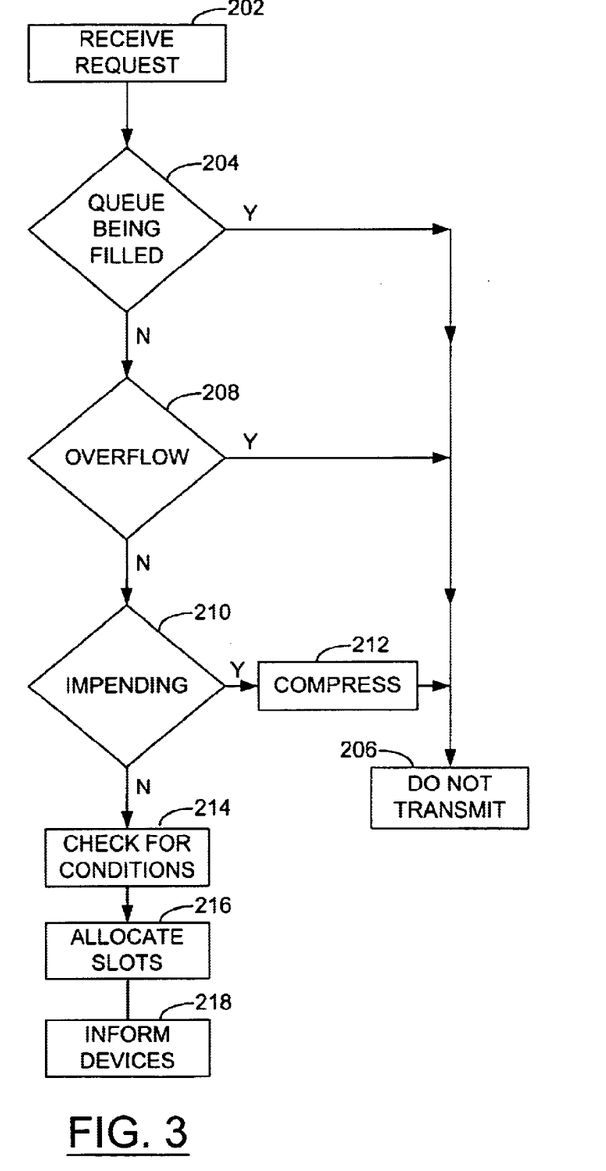
FIG. 3 is a flowchart of steps performed by a network manager for the dynamic allocation of bandwidth among four network devices on an uplink frequency.

FIG. 3 illustrates the steps performed by the network manager 12 for allocating the RF bandwidth on the uplink frequency. A device 14, 16, 18 or 20 initiates a transmission burst by sending a request to the network manager 12 on the setup channel. The request includes a destination device and a word count of the information to be sent to the destination device. The network manager 12 receives the request (step 202) and determines whether the queue of the destination device is being filled by another device (step 204). If the destination queue is being filled, the network manager 12 responds with a transmission on the setup frequency, the transmission requesting the device not to transmit its burst (step 206). If the destination queue is not being filled, the network manager 12 examines the destination queue for overflow (step 208). If the queue is already full, the network manager 12 requests the device not to transmit its burst(step 206). If the bursts would cause overflow (step 210), the network manager 12 sends a transmission on the setup channel for the device to increase the rate at which its information is compressed and not to transmit (steps 212 and 206). After increasing the rate, the device responds with a new request including a reduced work count. If the destination queue is ready to be filled, the network manager 12 checks for special conditions among the devices(step 214). After performing the check, the network manager allocates the slots among the devices 14, 16, 18 and 20 (step 216). The devices 14, 16, 18 and 20 are informed of the assignments on the setup frequency (step 218). Using the example above, the printer 20 does not transmit information and, therefore, is not assigned any slots on the uplink frequency. The first computer 14 is not assigned any slots after it has completed its transmission of the text file. Once the first computer 14 has finished transmitting, the slots on the uplink frequency are allocated among the second and third computers 16 and 18. Because the third computer 18 is transmitting video, it requires a greater bandwidth than the second computer 16, which is transmitting a bitmap file. Accordingly, the third computer 18 is allowed to transmit over more slots than the second computer 16.

Figure 4:
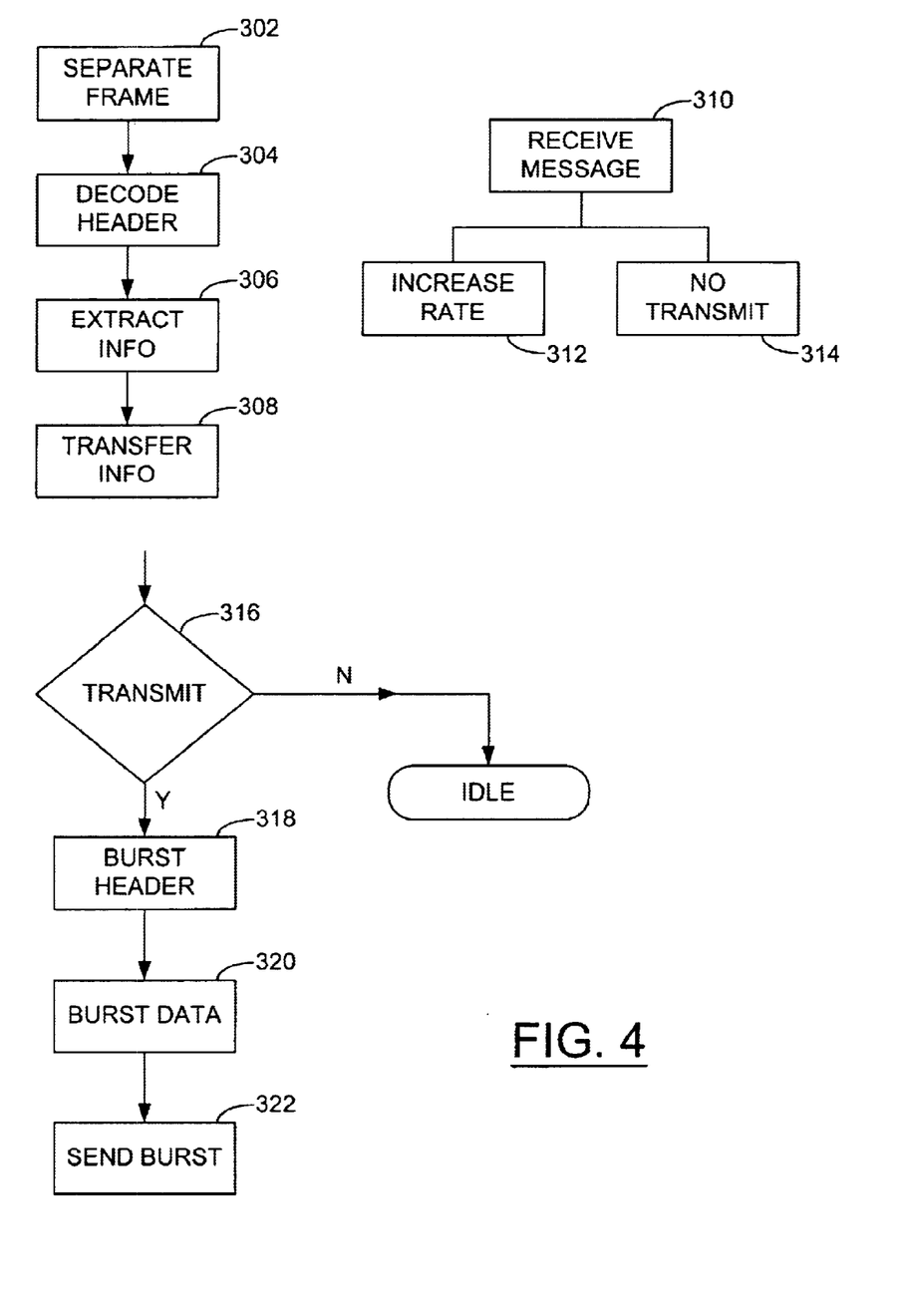
FIG. 4 is a flowchart of the steps performed by the device driver for each device.

FIG. 4 illustrates the steps performed by the device driver 26 of each device 14, 16, 18 and 20. When the transceiver 24 receives a frame from the network manager 12 on the downlink frequency, the device driver 26 separates the header portion from the data portion (step 302), decodes the header portion to determine which slots are assigned to its device (step 304), and extracts information only from the slots assigned to its device. The extracted information is stored in a buffer (step 306) and transferred to the device's processor (step 308).

When the transceiver 24 receives a message from the network manager 12 on the setup frequency (step 310), the device driver 26 decodes the message to determine whether it should increase the compression rate (step 312) or not transmit (step 314).

If the transceiver 24 has begun transmitting information on the uplink frequency to the network manager 12 (step 316), the device driver 26 formulates a burst header (step 318) and transfers data from the device's processor into the data portion of the burst (step 320). Then, the device driver 26 commands the transceiver 24 to transmit the bursts at the assigned time slots (step 322).

Certain advantages are inherent in the network 10. The network 10 is automatically configured to allocate the RF bandwidth according to the nature of the device 14, 16, 18 and 20. The printer 20, for example, does not transmit information to the computers 14, 16, and 18; therefore, it never makes a transmission request. Thus, its slots on the uplink frequency are always allocated among the computers 14, 16 and 18. The network 10 is also automatically configured to allocate the bandwidth according to the configuration of the device 14, 16, 18 and 20. If the first computer 14 is reconfigured to display video images only, it will not transmit information to the other computers 14, 16, and 18; therefore, its transmission slot on the uplink frequency will also be allocated among the second and third computers 16 and 18.

Figure 5:
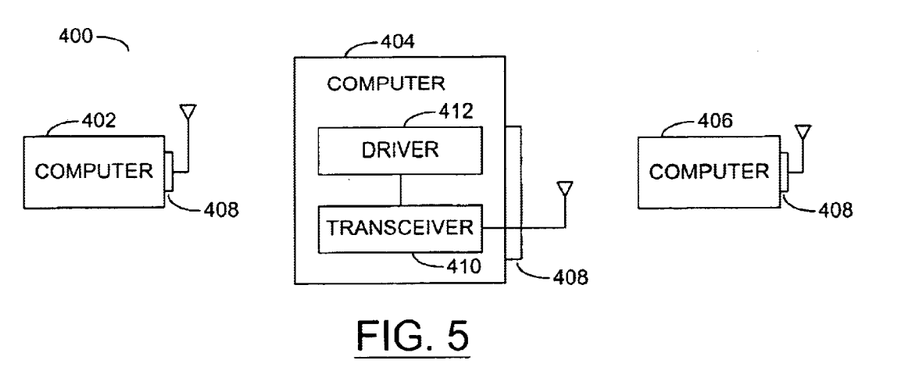
FIG. 5 is a block diagram of a wireless Ethernet according to the present invention.

FIG. 5 shows a wireless Ethernet 400 including three devices: a first computer 402, a second computer 404 and a third computer 406. The Ethernet 400 is a baseband network, providing only a single channel for RF communications across the airwaves. Consequently, only one device 402, 404 or 406 can transmit at a time. However, the device 402, 404 or 406 can use the entire RF bandwidth.

Mounted to the backplate of each device 402, 404 and 406 is an Ethernet card 408. Included on each Ethernet card 408 is a transceiver 410, which allows a device 402, 404 or 406 to transmit and receive information over the airwaves, and a device driver 412, which interfaces the transceiver 410 with the device's processor. The device driver 412 is itself a processor that is programmed to decode incoming transmissions for the computer's operating system and encode data from the operating system for outgoing transmissions.

The cabling specification of the wireless Ethernet 400 is different from that of a wired Ethernet, but the signaling specifications of the wireless Ethernet 400 and wired Ethernets are virtually the same. Generally, the Ethernet includes specifications for network cabling (OSI Model layer 1) and signaling (OSI Model layer 2). The specifications were originally developed in the late 1970s. In the 1980s, a baseband, CSMA/CD computer communication network over coaxial cabling was promoted, a "Blue Book Standard" was published, and Ethernet Version 1 was released. This standard was later enhanced, and in 1985 Ethernet II was released. Then the IEEE (Institute of Electrical and Electronics Engineer) began Project 802 and used Ethernet Version 2 as the basis for the 802.3 CSMA/CD network standard. The IEEE 802.3 standard is generally interchangeable with Ethernet Version 2. The greatest difference between Versions 1 and 2 is the construction of the network packet header The device driver 412 of the wireless Ethernet 400 employs a media access control known as CSMA/CD ("Carrier Sense Multiple Access, with Collision Detection"). CSMA/CD determines how information is placed on the airwaves. Before a device 402, 404 or 406 places information on the airwaves, its device driver 412 determines whether another device is already transmitting. Once the device driver 412 determines that the airwaves are clear, it commands the transceiver 410 to start transmitting information. In the meantime, it determines whether another device had started transmitting at the same time (if two devices transmit at the same time, a "collision" occurs).

The device driver 412 also performs bandwidth allocation by varying the rates of at which the transceiver 410 compresses the information that it transmits. Say, for example, the first device 402 is ready to transmit. The device driver 412 of the first device 402 commands its transceiver 410 to send out a ready-to-transmit signal on a setup frequency. If the second device 404 is already transmitting and detects a signal on the setup channel, the device driver 412 of the second device 404 increases the rate at which its transceiver 410 compresses the information. The increase in compression rate has the effect of shortening the bandwidth of the second device 404. Transceivers that utilize variable rates of compression are disclosed in U.S. Ser. No. 08/580,547, filed on Dec. 29, 1995, and incorporated herein by reference. The transceiver therein supports variable rate compression and utilizes multiple compression algorithms.

A standard transmission "packet" for the wireless Ethernet 400 includes a 62-bit Preamble, which is used by the transceiver 410 to acquire bit synchronization; a two-bit Start of Frame Delimiter, which is used to acquire bit alignment; a six-byte Destination Address; a six-byte Source Address; a two-byte Length or Type Field; Data, which can be between 46 bytes and 1500 bytes; and a four-byte Frame Check Sequence. Compression rates are embedded in the Data. Short packets of Data must be padded to 46 bytes. The shortest packet (including the compression rate and compression type) is 60 bytes, while the longest packet is 1514 bytes.

The interface card 408 could be modified to operate according to IEEE 802.5, the standard for Token-Ring-based LANs. Token Ring is a type of LAN that has stations wired in a ring, where each station constantly passes a special message (a "token") on to the next. The device having the token can send a message. To transmit full-motion video in a token, the video and audio signals would be compressed using the dynamic allocation method described in U.S. Ser. No. 08/580,547 above.

Figure 6:
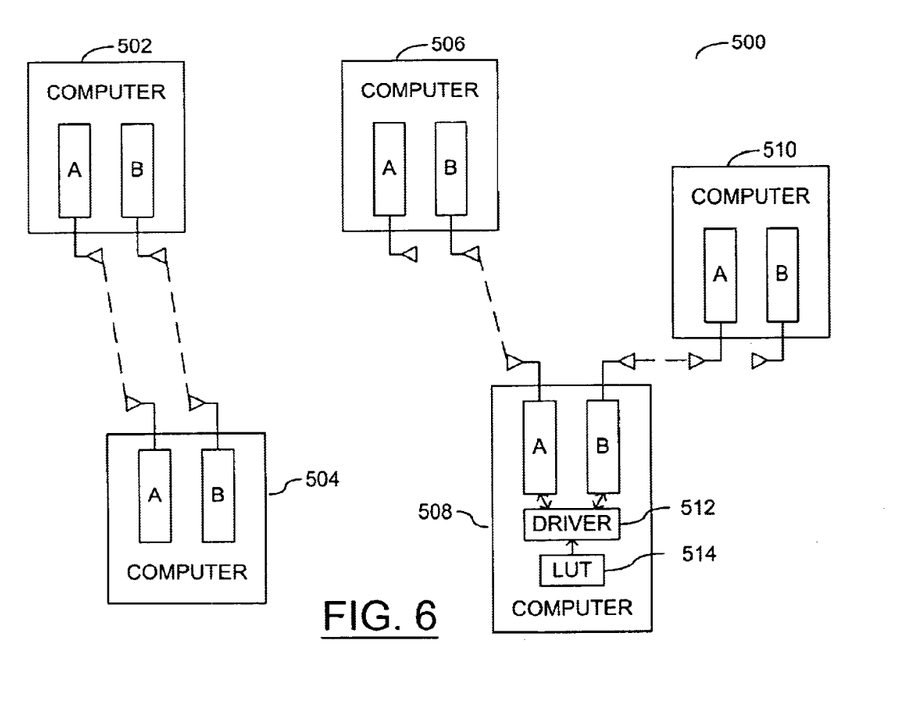
FIG. 6 is a block diagram of an FDM wireless network according to the present invention.

FIG. 6 shows a broadband network 500 including first, second, third, fourth and fifth devices 502, 504, 506, 508 and 510. The broadband network 500 uses a technique called "frequency division modulation". The RF bandwidth is divided into ten different channels, with each channel having its own unique carrier frequency. The different frequencies are multiplexed over the airwaves in such a way to allow multiple simultaneous "conversations" to occur. Each device 502, 504, 506, 508 and 510 is equipped with two transceivers A and B. Thus, the network 500 has ten receivers, each being "tuned" to a unique carrier frequency and being unable to receive signals tuned to the other carrier frequencies. The transmitter of each transceiver A and B can be tuned to different carrier frequencies.

Each device 502, 504, 506, 508 and 510 transmits information to a destination device by utilizing a device driver 512 and a lookup table 514. The lookup table 514 specifies the two unique frequencies of the receiver of each destination device 502, 504, 506, 508 and 510. The driver 512 tunes its transceivers A and B to transmit at the frequencies specified in the lookup table 514. For each transceiver A and B, the carrier signal is modulated with the encoded data and transmitted to the destination device. CSMA/CD is employed to avoid collisions.

For example, the first device 502 can send video images over two channels, simultaneously, to the second device 504. At the same time, the fourth device 508 can receive a single audio transmission from the third device 206 and, simultaneously, send data to the fifth device 510. Thus, the first device 502 is allocated maximum bandwidth for transmitting information, and the second device 504 is allocated maximum bandwidth for receiving information. The amount of information on any one channel can be increased by varying the compression rates as described above.

Because the networks 10, 400 and 500 are wireless, their devices 14, 16, 18, 20, 402, 404, 406, 502, 504, 506, 508 and 510 can be moved to any location, provided that they have sufficient power to communicate with each other. Power of the transmissions must be established to appear as distant noise signals to devices beyond the physical boundary of the network 10. In this regard, the distinction between LAN and WAN is blurred. The present invention can be configured as a LAN if its devices use low power transceivers, and it can be configured as a WAN if its devices use high power transceivers.

It will be understood that the embodiments described herein are merely exemplary and that many modifications and variations of the present invention are possible in light of the above teachings. Therefore, the scope of the present invention is limited only by the appended claims.

What is claimed is:

1. An Ethernet board comprising:
   a circuit board;
   a transceiver mounted to the circuit board and operable over an RF bandwidth; and
   a driver, mounted to the circuit board and coupled to the transceiver, for performing the steps of formulating packets for transmission by the transceiver; decoding packets received by the transceiver; and varying the compression rates of the packets for transmission.

2. A board for adapting a microprocessor-based device to communicate on a FDM network, comprising:
   a circuit board;
   a plurality of transceivers mounted to the circuit board and operable over an RF bandwidth, each transceiver being configured to receive RF signals at a unique frequency; and
   a lookup table mounted to the circuit board, the lookup table specifying a plurality of the unique frequencies; and
   a driver mounted to the circuit board, the driver configuring at least one of the transceivers to transmit at a frequency specified in the lookup table.

3. A circuit board device for use in a wireless baseband network for computers comprising:
   a transceiver configured to (i) transmit data packets by radio-frequency transmission for outgoing transmissions and (ii) receive data packets by incoming transmissions;
   a device driver processor programmed to (i) decode said incoming transmissions received from said transceiver for output to a computer processor and (ii) encode data from a computer operating system for said outgoing transmissions for output to said transceiver; and
   a circuit board housing said device driver processor and said transceiver, said circuit board for insertion into a computer, wherein said circuit board device is capable of bandwidth allocation in said wireless baseband network.

4. The circuit board device according to claim 3, wherein said transceiver is further configured to (a) transmit data packets in an uncompressed format and a compressed format and (b) detect when another transceiver is ready to transmit data packets in said wireless baseband network.

5. The circuit board device according to claim 4, wherein said transceiver is further configured to:
   have a setup frequency from which a ready-to-transmit signal is broadcast when said transceiver is ready to transmit data packets; and
   detect when said other transceiver is ready to transmit data packets by detecting said ready-to-detect signal transmitted by said other transceiver.

6. The circuit board device according to claim 3, further comprising a plurality of computers forming said wireless baseband network, each of said computers operatively connected to said circuit board device.

7. The circuit board device according to claim 3, wherein said transceiver transmits data packets according to a protocol compatible with and selected from a group of protocols consisting of the IEEE 802.3 CSMA/CD network standard protocol, the Ethernet protocol, the Ethernet Version 1 protocol, and the Ethernet Version 2 protocol.

8. The circuit board device according to claim 3, wherein said circuit board device is in a Token-Ring-based wireless network and said transceiver transmits data packets according to a Token-Ring-based network protocol.

9. The circuit board device according to claim 8, wherein said Token-Ring-based network protocol is compatible with the IEEE 802.5 Token-Ring network protocol.

10. A wireless communication device in a baseband network comprising:
   means for transmitting and receiving data modulated by a radio-frequency signal, said means for transmitting and receiving being (i) disposed in a wireless computer network and (ii) capable of compressing said data;
   means for encoding and decoding said data to and from said means for transmitting and receiving;
   means for receiving (i) said means for transmitting and receiving and (ii) said means for encoding and decoding into a computer; and
   means for performing bandwidth allocation in said baseband network by varying a compression rate of said data.

11. The wireless communication device according to claim 10, wherein,
   said means for transmitting and receiving is a transceiver configured to (i) transmit data packets in an uncompressed format and a compressed format and (ii) detect when another transceiver is ready to transmit data packets in said baseband network.

12. The wireless baseband circuit board device according to claim 11, wherein said transceiver is further configured to:
   have a setup frequency from which a ready-to-transmit signal is broadcast when said transceiver is ready to transmit data packets; and
   detect when said other transceiver is ready to transmit data packets by detecting said ready-to-detect signal transmitted by said other transceiver.

13. A method of communicating over a wireless baseband network, comprising the steps of:
   (A) communicating with a plurality of devices over a radio-frequency bandwidth by baseband network transmission with a transceiver and a driver coupled to said transceiver in each of said devices;
   (B) transmitting a plurality of data packets in an uncompressed format; and
   (C) compressing said data packets upon detection by one device of said devices that another device of said devices is ready to transmit data packets.

14. The method according to claim 13, further comprising the step of transmitting said data packets with a protocol selected from a group of protocols consisting of the IEEE 802.5 Token-Ring network protocol, the IEEE 802.3 CSMA/CD network protocol, the Ethernet protocol, the Ethernet Version 1 protocol, and the Ethernet Version 2 protocol.

15. A wireless broadband network comprising:
   a plurality of devices forming a broadband radiofrequency network;
   at least one transceiver disposed in each of said devices, each of said transceivers (i) being capable of transmitting data to another transceiver of said transceivers according to frequency division modulation, and (ii) can transmit and receive data on at least one unique predetermined carrier frequency; and
   a lookup table disposed in each of said devices for storing a plurality of predetermined carrier frequencies associated with each of said devices,
   whereby a first device of said devices can transmit and receive data to and from a second device of said devices by tuning said transceiver of said first device to said at least one unique predetermined carrier frequency associated with said second device.

16. The wireless broadband network according to claim 15, further comprising a driver disposed in each of said devices and configured to (i) receive data from said transceiver and (ii) send data to said transceiver from a computer processor, wherein each of said devices has two carrier frequencies of said unique carrier frequencies at which said device can transmit and receive data.

17. The wireless broadband network according to claim 16, wherein:
   said data is transmitted by said transceivers according to a protocol compatible with and selected from a group of protocols consisting of the IEEE 802.3 CSMA/CD network standard protocol, the Ethernet protocol, the Ethernet Version 1 protocol, the Ethernet Version 2 protocol, and the IEEE 802.5 Token-Ring network protocol; and
   a computer interface card houses (i) said driver, (ii) said transceiver and (iii) said lookup table for each of said devices, said computer interface card being receivable by a computer.

18. The wireless broadband network according to claim 15, wherein each of said transceivers is configured to
   transmit data in an uncompressed format and
   (ii) transmit data in a compressed format upon detection that another transceiver is ready to transmit data.

19. A device for a wireless broadband network comprising:
   means for transmitting and receiving data by radio-frequency modulation;
   means for driving said means for transmitting and receiving to a specified frequency of a plurality of predetermined frequencies for transmission;
   means for storing said predetermined frequencies associated with a plurality of means for transmitting and receiving, said means for storing operatively coupled to said means for driving; and
   means for varying a compression rate of said data prior to transmitting.

20. The device according to claim 19, wherein:
   said means for transmitting and receiving is a transceiver;
   said means for driving is a processor;
   said means for storing is a look-up table; and
   said transceiver, processor and said look-up table are housed on a network card for a computer.

21. The device according to claim 20, further comprising a plurality of said network cards, each of said network cards having a transceiver that transmits data to other network cards in said wireless broadband network by frequency division modulation, each of said transceivers having at least two frequency channels to transmit data.

22. The device according to claim 21, wherein each of said transceivers is configured to detect that another transceiver at a same predetermined frequency is ready to transmit data.

23. A method of communicating over a wireless broadband network by frequency division modulation comprising the steps of:

(A) communicating among a plurality of devices over a radio-frequency bandwidth by broadband network transmission, each of said devices having a transceiver and a driver coupled to said transceiver;

(B) transmitting a plurality of data packets by said transceivers, said transmission occurring over a plurality of frequency channels;

(C) tuning said transceivers among said frequency channels with said drivers;

(D) storing in a lookup table in each of said devices a plurality of predetermined frequencies associated with said transceivers in said wireless broadband network; and (E) looking up a particular frequency of said predetermined frequencies from said lookup table whereby a first driver of said drivers may tune a first transceiver of said transceivers to said particular frequency when it is desired to transmit to a particular transceiver of said transceivers in said wireless broadband network associated with said particular frequency.

24. The method of communicating according to claim 23, further comprising the steps of:

compressing data transmitted by said first transceiver;

detecting in said first transceiver that said particular transceiver has a ready-to-transmit condition; and increasing a compression rate of data transmitted by said first transceiver upon detection of said ready-to-transmit condition.

25. The method of communicating according to claim 23, further comprising the step of transmitting data with a protocol selected from a group of protocols consisting of the IEEE 802.5 Token-Ring network protocol, IEEE 802.3 CSMA/CD network protocol, the Ethernet protocol, the Ethernet Version 1 protocol, and the Ethernet Version 2 protocol.

26. The Ethernet board according to claim 1, wherein said transceiver transmits data packets according to a protocol compatible with and selected from a group of protocols consisting of the IEEE 802.5 Token-Ring network protocol, the IEEE 802.3 CSMA/CD network protocol, the Ethernet protocol, the Ethernet Version 1 protocol, and the Ethernet Version 2 protocol.

27. The board according to claim 2, wherein said plurality of transceivers are configurable to transmit to a device over at least two channels simultaneously.

28. The circuit board device according to claim 3, wherein said device driver processor is further configured to command an increase in a compression rate to reduce said bandwidth allocation when said transceiver detects that another transceiver is ready to transmit data packets in said wireless baseband network.

29. The wireless communication device according to claim 11, wherein said means for encoding and decoding is a device driver processor operatively connected to said processor and programmed to (i) encode data from said computer operating system, (ii) decode data packets received from said transceiver and (iii) command an increase in said rate of compression when said transceiver detects that said other transceiver is ready to transmit data packets in said baseband network.

30. The wireless communication device according to claim 10, wherein said means for receiving is a computer interface card adapted to fit into said computer, said computer having a processor and an operating system.

31. The wireless broadband network according to claim 18, wherein each of said transceivers is further configured to detect that said other transceiver in said wireless broadband network is ready to transmit data at a predetermined frequency.

32. The device according to claim 22, wherein each of said transceivers is further configured to compress data transmitted upon detection that said other transceiver is ready to transmit data.

* * * * *